INVENTOR.
WALTER C. BEARD JR.
BY Steward & Steward
his ATTORNEYS

Sept. 24, 1963     W. C. BEARD, JR     3,104,785
METERING VALVE FOR PRESSURE PACKAGES
Filed July 11, 1960     5 Sheets-Sheet 2

INVENTOR.
WALTER C. BEARD JR.
BY Steward & Steward
his ATTORNEYS

INVENTOR.
WALTER C. BEARD JR.
BY Steward & Steward
his ATTORNEYS

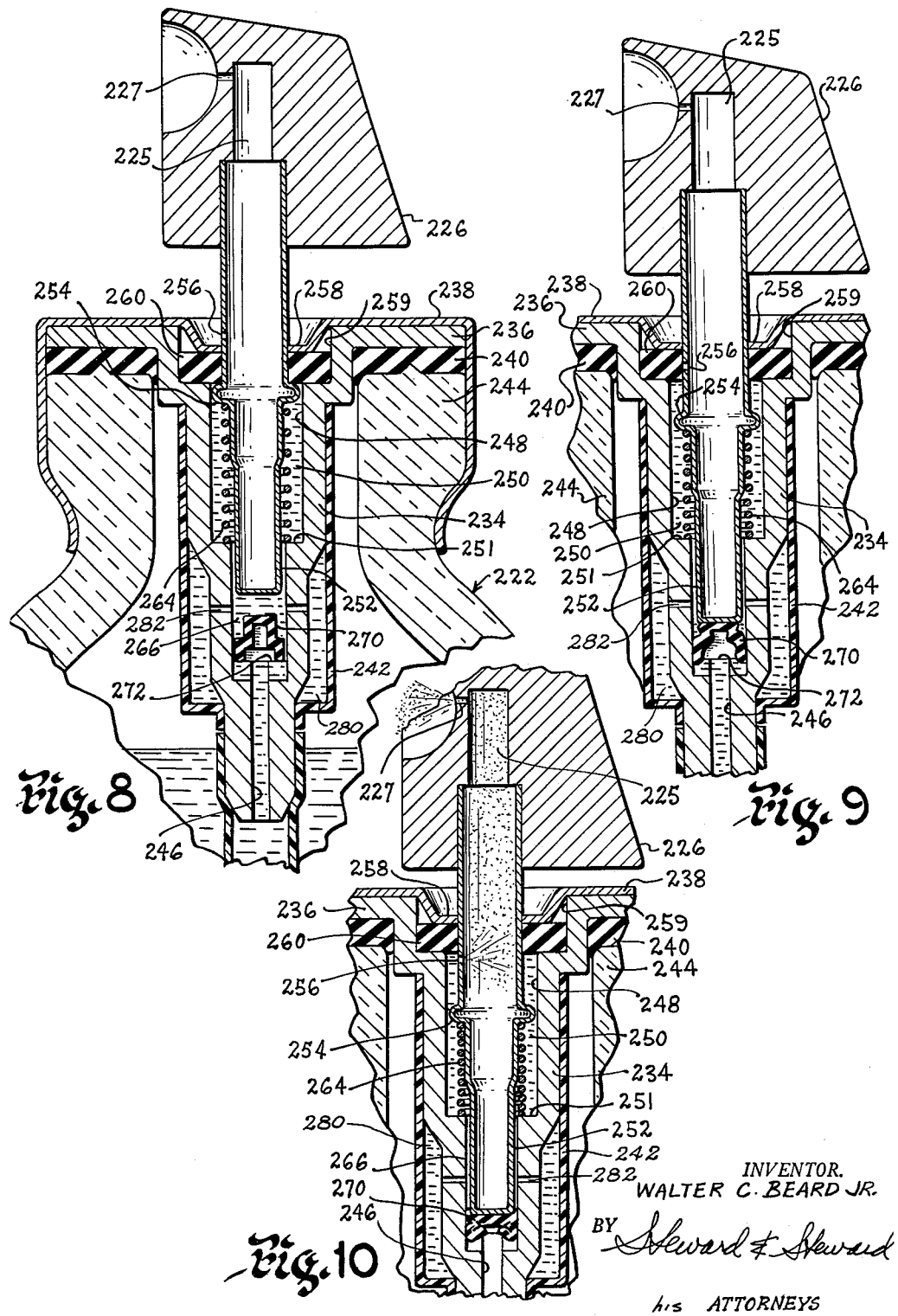

United States Patent Office 3,104,785
Patented Sept. 24, 1963

3,104,785
METERING VALVE FOR PRESSURE PACKAGES
Walter C. Beard, Jr., Middlebury, Conn., assignor to The Risdon Manufacturing Company, Naugatuck, Conn., a corporation of Connecticut
Filed July 11, 1960, Ser. No. 42,172
15 Claims. (Cl. 222—207)

This application is a continuation-in-part of my now abandoned copending application, Serial No. 773,004, filed November 10, 1958.

The invention disclosed herein relates generally to metering valves for containers employed in pressure packaging of fluid materials for consumer use. This invention relates especially to metering valves for inexpensive, throw-away containers in which a wide variety of gaseous, liquid or semi-liquid consumer goods are today packaged for convenient and economical dispensing as required. Such pressure packages include a fluid product which comprises the active ingredient or material to be dispensed, in conjunction with a suitable gaseous propellant of super-atmospheric pressure, whereby the contents of the container are dispensed as desired by a user upon actuation of an operating member provided for that purpose in the metering valve. The devices of the present invention are designed more particularly to effect the dispensing of identical, measured amounts of the contents of the container to which they are attached each time the operating member of the valve is actuated.

Metering valves for self-contained pressurized packages, often referred to as "aerosol" packages although that name has now become something of a misnomer with the rapid expansion of the type of products and the formulations thereof now being packaged in self-contained pressure packages, have proved highly effective in certain applications. The number of these applications is constantly expanding as more and more products in which the active ingredient is customarily used only in metered quantities are put out in "aerosol" package form. Typical examples of this type of product are those embodying pharmaceuticals, perfumes, toothpastes and certain food products such as syrups, seasonings and the like. However, the pressure packaging of such products so as to dispense a metered quantity of the product each time the actuator for the package is depressed, presents very difficult problems.

One of the chief difficulties involved is that of obtaining a satisfactory and inexpensive valve which can be adapted to give a wide range of metered quantities. The difficulty lies in the fact that because of the differing metering requirements of each product, the metering valve must be specifically designed for that product alone. The special design of each valve means that special tools and dies are required in order to fabricate each valve. In effect, the design and manufacture of each valve is a custom job and the higher costs which attend such custom manufacture make such valves considerably more expensive than the usual nonmetering valve and seriously limit their application. While metering valves could be manufactured in a series of standard dispensing quantities, such a procedure would require a manufacturer to maintain uneconomically large valve inventories and still would not cover all the possible product applications.

Another difficulty encountered in the pressure packaging of metered products is that of obtaining a metering valve which will satisfactorily dispense the product in the desired metered quantities regardless of the propellant used in the package. The metering valves heretofore available have been limited in their use to those formulations wherein the active ingredient to be dispensed from the container is soluble in, or at least substantially miscible with, a low-boiling liquid employed as the pressurizing medium or propellant in the package. The usual alternative, where the active ingredient and propellant are not mutually soluble or miscible, has been to employ a third or carrier liquid in which both the active ingredient and propellant are soluble. This limitation on metering valves of the kind heretofore available is imposed by reason of the fact that such valves function by first trapping in a metering chamber a quantity of the fluid product separate from the main supply of fluid product in the container, the quantity trapped and subsequently dispensed by each actuation of the valve operating member being dependent on the size of the metering chamber. The fluid product is delivered to the metering chamber of the device either by inverting the container or more usually by means of a dip tube through which the fluid product flows under the pressure of the propellant within the container. This trapped quantity of fluid is then vented to atmosphere upon actuation of the valve operating member after the latter, in the course of its movement, first closes off the entry of a further portion of the fluid product into the metering or measuring chamber. Where the active ingredient and propellant are mutually soluble, the trapped quantity of fluid product in the metering chamber contains a mixture of both propellant and active ingredient. Due to the fact that the low boiling liquid propellant has a vapor pressure higher than that of the atmosphere, the propellant boils off when the metering chamber is vented to atmosphere, and such boiling off of the propellant carries with it the active material with which it is intimately mixed in the metering chamber.

From the foregoing it will be apparent that in metering valve constructions heretofore available, satisfactory performance of metered or measured dispensing of a product from a self-pressurized package is dependent on the presence of some propellant in the metering chamber of the valve each time it is desired that dispensing shall occur. Where the propellant and active ingredient are not mutually soluble or miscible, or are not dissolved in a carrier liquid, little or no propellant will be present in the metering chamber on each actuation of the operating member. It is for this reason that earlier metering valves used for normal aerosol formulations, i.e. substantially homogeneous mixtures or solutions of propellant and active ingredient, are not usable for formulations of nonhomogeneous type. There are many cases when the latter type of formulation is not only desirable but necessary, owing to considerations of taste, toxicity, chemical reaction or other adverse effects upon the product imposed by the use of a carrier liquid, or the fact that no carrier liquid is available in which the propellant and active ingredient are mutually soluble. The so-called 3-phase formulations widely used today in non-metered pressure packages are examples in point. In such formulations there are at least two immiscible liquid phases present, one being the liquefied propellant, the other being or carrying the active ingredient to be dispensed. In addition there is also present a third phase, this being gaseous propellant in equilibrium with the liquid phase thereof under the existing pressure-temperature conditions in the container. For the same reasons, prior metering valve constructions have not been available for pressure packages employing gaseous propellants which do not condense at all at the temperature-pressure conditions desirable to be maintained in the pressure package. In the majority of such cases, little or none of the propellant gas is soluble in the ingredient to be dispensed, and generally it is undesirable that it should be since it may adversely affect the product for a number of reasons. This being so, there is no energy available in the trapped or metered quantity of fluid product to cause it to be expelled from the metering chamber of the device in the valve when the operating member is actuated by the user.

In the present invention, both of the problems discussed above are successfully surmounted. Applicant's invention provides a basic metering valve structure that is suitable for use in all applications and which is so constructed that its metering capacity can be easily and inexpensively augmented to give any desired quantity without replacing any of the valve parts or disassembling the basic valve structure. By reason of this adaptability the basic valve construction of the present invention may be economically produced and assembled in large quantities and then provided with any desired auxiliary metering capacity to give or bring the total metering capacity of the valve to the exact quantity required by each customer's order. Also, by reason of the present invention substances which are insoluble in or immiscible with the economically and practically usable types of propellants available today, or ingredients which although miscible or soluble in such propellants would be dispensed by such propellants in an undesirable physical state or condition, may nevertheless be put up in pressure packages to obtain the convenience of automatically metered or measured dispensing thereof afforded by such packaging.

An object of the invention is to provide a basic metering valve for pressure packaging wherein the product metering capacity of the valve may be easily and inexpensively varied by the manufacturer over a wide range in accordance with the specific requirements determined by the product being so packaged with a minimum of change in, and without the necessity of replacing or disassembling any parts of, the basic valve construction.

Another object of the invention is to provide metering valves capable of use not only with typical "aerosol" formulations as described hereinabove, but also with the so-called 3-phase systems or those in which the active ingredient and propellant are not mutually soluble or miscible. And of most significance, it is an object of the invention to provide a metering valve for use on pressure packages in which a propellant gas, noncondensible at the pressure-temperature conditions obtaining in normal use of the package, may be satisfactorily employed.

A further object is the provision of a metering valve of practical and rapid pressure-filling characteristics, that is, a valve which allows a container to be charged with propellant for pressurizing the contents thereof after the contents have been placed in the container and the valve assembly permanently secured to the container.

A still further object of the invention is to achieve a metering valve construction which will provide the functions described above with a minimum of structural complexity while assuring reliable operation even after extended storage periods to which the packages may be subjected.

These and other objects of the invention will become apparent from the description which follows, wherein certain presently preferred embodiments of the invention are described in detail with reference to the accompanying drawings, wherein:

FIG. 8 is a fragmentary sectional view in side elevation of a pressure package incorporating another metering valve embodying the invention, the metering valve being shown in its normal nondispensing condition;

FIG. 9 is a view similar to that of FIG. 8 wherein the metering valve is shown with the valve actuator partially depressed; and FIG. 10 is another view similar to FIG. 8 wherein the metering valve is shown in its actuated or dispensing condition.

Figure 1:
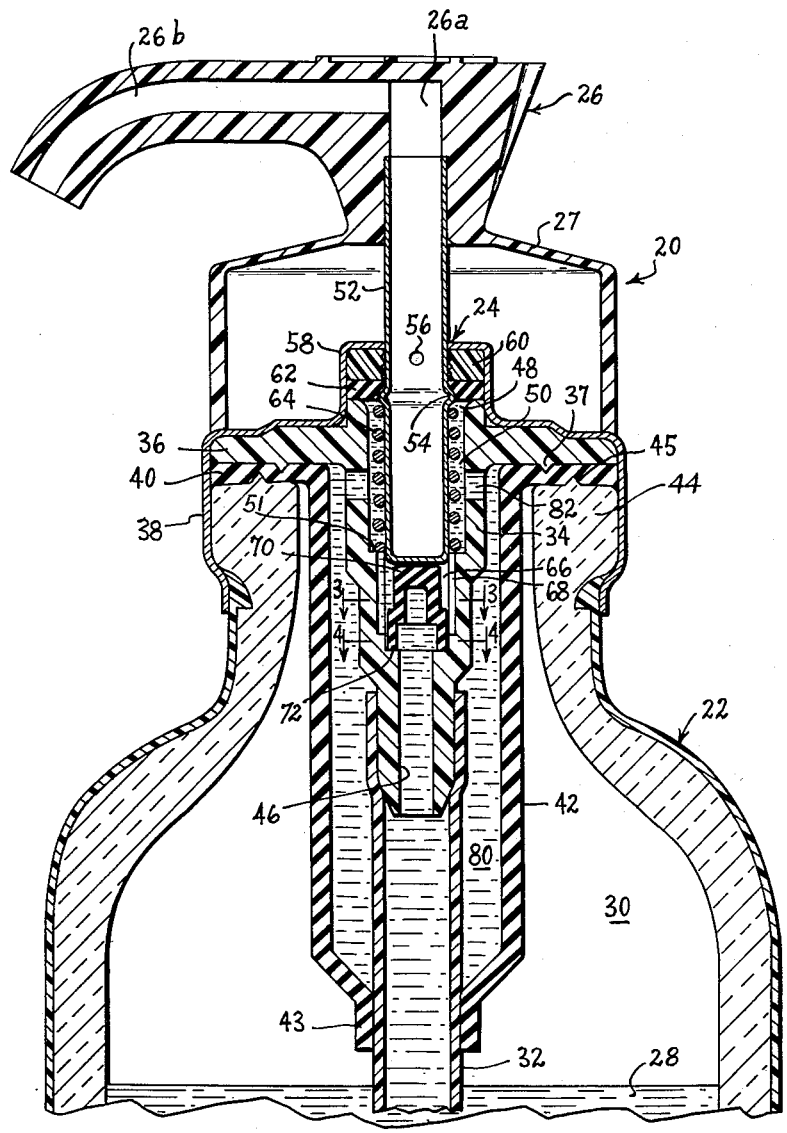
FIG. 1 is a fragmentary sectional view in side elevation of a pressure package incorporating a metering valve embodying the invention, the metering valve being shown in its normal, nondispensing condition.
Figure 2:
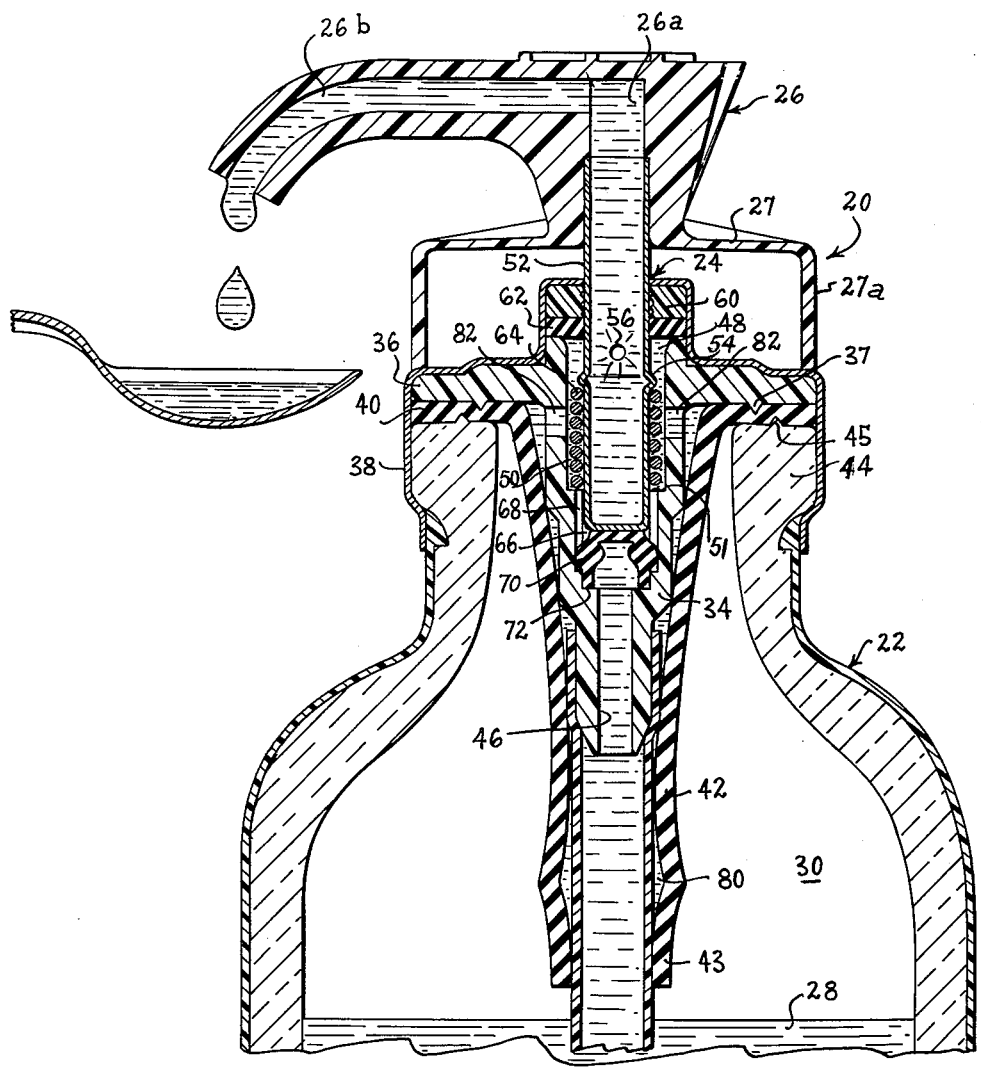
FIG. 2 is a similar view wherein the metering valve is shown in its actuated or dispensing condition.

Referring now to the drawings and more particularly to FIGS. 1 and 2 thereof, a typical pressure package indicated generally at 20 comprises in this instance a plastic coated glass container 22, a metering valve assembly 24 suitably secured to the container and a combined dispensing nozzle and valve actuator 26. The container is partially filled with a fluid product 28 which it is desired to dispense, and with a propellant, the gaseous phase of which fills the header space 30 between the surface of the liquid product 28 and the upper end of container 22. The propellant exerts a pressure greater than atmospheric whereby the fluid product is forced upwardly into the main body of the valve through a dip tube 32 depending from the valve assembly 24, escape of the product 28 being normally prevented by the valve assembly. Upon actuation of a valve operating member, in the example shown this being accomplished by vertical depression of the actuator or dispensing nozzle 26 as seen in FIG. 2, a measured quantity of the fluid product is dispensed through the nozzle of actuator 26.

Valve assembly 24 comprises means for controlling the flow of fluid product 28 from the main supply thereof in container 22 into the main body of the valve assembly, and from the latter to atmosphere through the dispensing nozzle 26 upon actuation of the valve operating member. Assembly 24 also includes means for measuring the volume of fluid product dispensed with each actuation of the valve.

The basic structure of the valve assembly here shown for illustrative purposes corresponds in large measure to that described in my earlier Patent No. 2,932,432. This structure includes a substantially rigid tubular valve body or housing 34 preferably formed of suitable molded plastic although other materials may also be used. The body is provided with a peripheral flange 36 which is clamped between a metal closure cap 38 and a sealing grommet or flange portion 40 forming an integral part of a resilient walled sack 42 made of suitable elastomeric material. The sack 42 is not a part of the basic valve construction and its function will be described in full presently. Resilient flange portion or grommet 40 of the sack 42 sits upon lip 44 at the mouth of container 22, and the rigid flange 36 of the valve body overlies the grommet. Both the lip of the container and the under surface of flange 36 are formed with circular rings 45, 37, respectively, which project toward each other to ensure better sealing engagement with grommet or flange portion 40. Flange 36 and sealing grommet 40 are held in container-sealing position by metal closure cap 38 which is tightly crimped about the shoulder formed by lip 44 at the mouth of the container.

Valve body 34 has a fluid inlet port 46 and an outlet port 48 at respectively opposite ends. Intermediate such ends the body is formed to provide a stepped, hollow interior having concentric chambers diminishing in diameter from top to bottom. The outer or uppermost chamber 50 receives a valve operating member comprising a tubular valve stem or plunger 52, the diameters of the plunger 52 and chamber 50 being such that there is an annular space between them. Plunger 52 is preferably a formed metal tube closed at its inner or lower end and provided intermediate its length with a flange or enlargement 54 above which is located a restricted port or opening 56 in the wall of the tube. The upper end of plunger 52 passes through an aperture formed in a domed portion 58 of closure cap 38, and is guided against lateral movement by the margin of such aperture. Dome 58 contains a labyrinth packing gland 60 and subadjacent thereto a resilient annular seal 62, both of suitable plastic material. The gland and seal each form a sliding but fluid tight seal with the periphery of plunger 52, permitting reciprocation of the latter without loss of propellant pressure around the plunger body during movement thereof. A coiled compression spring 64 surrounds the inner end of plunger 52 and is disposed within outer chamber 50 of valve body 34. At its lower end, spring 64 rests on shoulder 51 defining the bottom of chamber 50, while the upper end of the spring is engaged under and presses upwardly on enlargement 54 of the plunger to cause the latter to assume normally an outer position limited by engagement of the upper side of the enlargement 54 with the under face of seal 62.

Actuator 26 for the valve assembly is preferably made of molded plastic material and is formed to provide a socket 26a into which the open upper end of plunger 52 is inserted, engaging the wall thereof with a tight frictional fit circumferentially. A discharge passage 26b running through the spout of the actuator communicates with socket 26a within the actuator body.

When actuator 26 is depressed vertically by finger pressure on its upper surface, plunger 52 is depressed vertically also, as shown in FIG. 2. To permit such vertical depression of the plunger, skirt 27 of actuator 26 is made in the form of a flexible diaphragm with depending side walls 27a which latter rest on the top of the container and thus support skirt 27 for flexural movement. The skirt and depending walls serve also to enclose the upper end of the valve assembly and help to prevent ingress of dirt to the valve seals at this point. The aforesaid downward movement of plunger 52 causes restricted port 56 to be brought below seal 62 and thus into communication with the outlet port 48 of chamber 50, thereby allowing that chamber to exhaust to atmosphere through the open upper end of the hollow plunger and passages 26a, 26b in the body and spout of the actuator. Release of the actuator allows the plunger to return under the influence of spring 64 and skirt 27 to the position shown in FIG. 1, where plunger enlargement 54 again engages seal 62 and seals chamber 50 to prevent further discharge therefrom.

Figure 3:
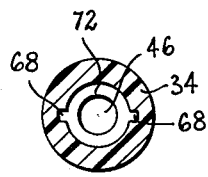
FIG. 3 is a sectional view in plan taken on line 3—3 in FIG. 1, looking in the direction of the arrows.

The dip tube 32 and the inlet port 46 together comprise conduit means leading to the valve body 34 and the fluid product 28 is forced upwardly through the conduit means by the pressure of the gaseous propellant in the head space 30. For controlling the inlet of fluid to the valve body, the chamber 50 is provided at its lower or inlet end with additional sealing means which cooperate with the outlet seal 62 just described. Extending below chamber 50 within body 34 is a chamber 66 of reduced diameter, and an inlet port sealing member in the form of a resilient, deformable plug 70, resting loosely therein. This plug is preferably composed of an elastomeric material which is capable of ready compression to a substantial degree, in the process of which it expands or swells laterally of the direction of application of the compressing force. Such force is provided by engagement of the lower, closed end of plunger 52 against the plug. In its normal condition, plug 70 is of slightly smaller diameter than chamber 66 so as to be spaced peripherally from the surrounding walls of the chamber. Fluid may thus pass around the plug through chamber 66 into chamber 50. To facilitate the passage of the fluid around the plug, the upper portion of chamber 66 is provided with a pair of diametrically opposed, axially extending grooves 68, as seen in cross section in FIG. 3.

Figure 4:
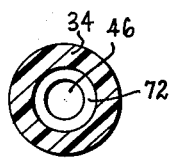
FIG. 4 is a sectional view in plan taken on line 4—4 in FIG. 1, looking in the direction of the arrows.

As here shown, plug 70 takes the form of an inverted cup which normally rests with its rim supported on an annular shelf or shoulder 72 surrounding the inlet port 46 at the bottom of chamber 66. (See FIGS. 3 and 4.) Plug 70 is somewhat shorter axially than the distance between the inner end of plunger 52 and the end wall or shoulder 72 at the bottom of inner chamber 66, and the plug is thus permitted some axial as well as lateral play within chamber 66 when the plunger is in its normal, outer position. The proximity of the wall of chamber 66 to the sides of the inlet port sealing member or plug 70, however, is such that the latter always remains properly oriented as shown and is unable to tumble or to become displaced from a position substantially in axial alignment with inlet port 46.

Plunger 52 is axially slidable in valve body 34, as mentioned above, being movable between inner and outer limiting positions. The outer position is shown in FIG. 1, to which it is normally urged by spring 64. A loose sliding fit is made by the lower end of plunger 52 within chamber 66 whereby it is held against lateral displacement. As plunger 52 is depressed, the inlet and outlet ports are respectively closed and opened sequentially whereby, prior to the arrival of restricted port 56 below seal 62 and into communication with the outlet port 48 of chamber 50, plug 70 is engaged by the lower end of the plunger compressing it against seat 72, thereby shutting off entry of further fluid from inlet 46 to chambers 66 and 50. Further depression of the plunger, as permitted by the resilience of plug 70, forces the plug to expand laterally into tight, sealing relation with the walls of chamber 66, further ensuring against entry of additional fluid from the container body. This further downward movement of plunger 52 also causes restricted port 56 to move below seal 62, into communication with chamber 50, and fluid within the chamber may then be exhausted through the dispensing spout as previously described. If the fluid product 28 which is being dispensed has mixed with it in some manner a fluid which exerts a vapor pressure substantially higher than atmospheric under the temperature conditions prevailing, such fluid will volatilize upon opening of chamber 50 to atmosphere when the plunger is depressed. Disregarding for the moment the auxiliary chamber member or sack 42, fluid present in chamber 50 will thus be forced by the trapped propellant to flow out through the dispensing nozzle, the amount being determined by the volume of chambers 50 and 66. Once this material is exhausted, further dispensing stops so long as the plunger is held depressed. On release of the latter to allow it to return to its upper position, restricted outlet 56 is first brought above seal 62 prior to the release of compressive action of plunger 52 on the plug, so that by the time the latter returns to normal position allowing fluid to enter chamber 66 through inlet 46, the outlet port of the valve assembly has been closed.

From the foregoing description it will be seen that the chambers 66 and 50 together form a first fluid chamber that entraps a predetermined amount of fluid which may consist of both fluid product and the liquid propellant or, as will appear hereinafter, of fluid product alone.

So much of the construction and operation of the portion of the basic metering valve structure just described is in accordance with the disclosure contained in the aforesaid patent No. 2,932,432. While the patented structure operates very satisfactorily in practice as a metering valve it will be noted that the amount of fluid product dispensed by the valve is determined by the volume of the chambers 50 and 66 and that for each valve this volume is fixed. Thus, the metering capacity of the valve can only be varied by changing the size of the valve body 34 and the chambers 50 and 66 at the time the valve is fabricated. It will also be noted that the dispensing of product material in the foregoing illustration was dependent on the presence within metering chambers 50 and 66 of a volatile propellant in admixture with the product to be dispensed, in order that the latter be expelled from the metering chambers. The pressure of propellant in the header space 30 above the level of product 28 in container 22 is not available, in that portion of the valve so far described, as a source of energy for forcing the contents of chambers 50 and 66 through the dispensing nozzle, due to the closing of inlet port 46. Thus the valve assembly would not, without the further improvements about to be described, function to dispense a wide range of metered dosages of product 28 nor metered dosages where the propellant employed does not form an intimate admixture with the product fluid, either by dissolving therein or by being substantially miscible therewith. This is all the more true where the propellant employed is an inert gas, such as nitrogen, carbon dioxide or the like, which not only may be insoluble in or immiscible with the product fluid but which does not condense under normal ambient temperatures except at pressures far above those either economical or safe to employ in pressure packaging of goods for consumer use.

In order to permit the metered dispensing of fluid products over a wide range and the metering of fluid products using such inert, non-condensible gases (at least at pressure-temperature conditions normally desired to be maintained in the type of package here concerned), the present valve assembly 24 includes a separable, auxiliary, flexible-walled casing defining a chamber associated with the valve body 34 and communicated with the metering chambers 50 and 66 and also so disposed as to be directly subject to the pressure of the gaseous propellant occupying header space 30 in the container. In the constructions illustrated in FIGS. 1 and 2, this separable casing comprises the flexible-walled sack 42 mentioned hereinabove. This sack envelopes a portion of the valve assembly 24 within the container and is supported therein at its upper end by gripping engagement of its peripheral grommet portion 40 between the overlying substantially rigid flange 36 of valve body 34 and the upper surface of lip 44 of container 22, as previously described. At its lower end, sack 42 is provided with an aperture, the margin or lip 43 of which resiliently hugs the periphery of dip tube 32 forming the lower extension of valve assembly 24. Under normal conditions, the gripping engagement of lip 43 serves to effect a seal so that fluid may neither enter nor leave the interior of the sack by passage between lip 43 and the dip tube 32. Intermediate the ends of sack 42, its wall is normally spaced from valve body 34 so that the interior of the sack forms a chamber 80. The latter communicates with chamber 50 of the valve body by means of ports 82 formed through the wall of valve body 34 just below flange 36 and forms a second fluid chamber for the entrapment of a predetermined amount of fluid. Chambers 80, 50 and 66 thus all intercommunicate, but chamber 80 alone determines the amount of fluid actually dispensed on each actuation of the valve where the propellant is a non-condensible gas or where a 3-phase formulation is packaged, and the following description will proceed on this assumption. Where such propellants are used, the fluid product trapped in the metering chambers of the valve consists substantially entirely of active ingredient.

It will be readily seen that, in the nondispensing condition of the valve assembly, an equilibrium between the pressure within sack 42 and the surrounding header space 30 of the container will be quickly established by flow of product fluid 28 from the main supply thereof up through dip tube 32, through inlet port 46, around plug 70 (which is in its non-compressed condition), through chambers 66, 50, through ports 82 to chamber 80. Chamber 80 will thus be filled with the fluid product together with chambers 50 and 66, and, owing to the transmission of the propellant pressure through the sack walls which act merely as a membrane, the fluid in these chambers is all subject to the full pressure of the propellant in header space 30. This fluid cannot of course escape, however, because the outlet port is closed. When the valve assembly is actuated by depressing the dispensing head 26, the inlet of further fluid to the several chambers will first be shut off by the inlet port sealing means prior to the opening of the discharge port. However, upon arrival of actuator head 26 and plunger 52 at substantially fully depressed position wherein the outlet port 48 is vented to atmosphere through restricted orifice 56, the equilibrium condition previously existing between header space 30 and the fluid in the several chambers 66, 50 and 80 no longer obtains since this fluid is now opposed only by atmospheric pressure which, by design, is appreciably less than that of the propellant in header space 30. Accordingly, the pressure of the propellant in header space 30 causes the walls of the flexible sack 42 to collapse toward the valve body 34 and upper portion of dip tube 32, as seen in FIG. 2, thereby expelling fluid from that chamber through ports 82 into chambers 50 and 66. Having no other escape, the fluid passes through restricted orifice 56 into hollow plunger 52 and thence out through the dispensing nozzle. When the sack is completely collapsed against the valve body, the dispensing action ceases, and no further product is dispensed until the actuator is released and allowed to return to its upper position in readiness for a repetition of the cycle of operation just described.

It will be clear from the foregoing description that the resilient sack 42 forms a contractible hollow casing which, when the outlet port 48 is vented to atmosphere, contracts under the pressure of the gaseous propellant in the header space 30 to expel the fluid material therewithin.

The metering valve arrangement just described works equally well, therefore, with non-condensible gas propellants as with those which are condensible at the ordinary ambient temperature and pressure conditions desired to be maintained in pressure packages of the type employed for consumer goods. And the construction further permits the metered dispensing of product fluids by means of condensible gaseous propellants which are, however, neither soluble in nor miscible with the product that is to be dispensed. It will also be noted that the gripping engagement of the grommet or flange portion of the sack between the rigid flange of the valve body and the lip of the container presents a simple arrangement by means of which a separable auxiliary metering chamber may be added to the basic valve structure. In this manner, it is possible to adapt the basic metering valve structure to any desired metering capacity simply by adding a separable auxiliary metering chamber of proper size and communicating it with the inner metering chambers of the basic valve.

Figure 5:
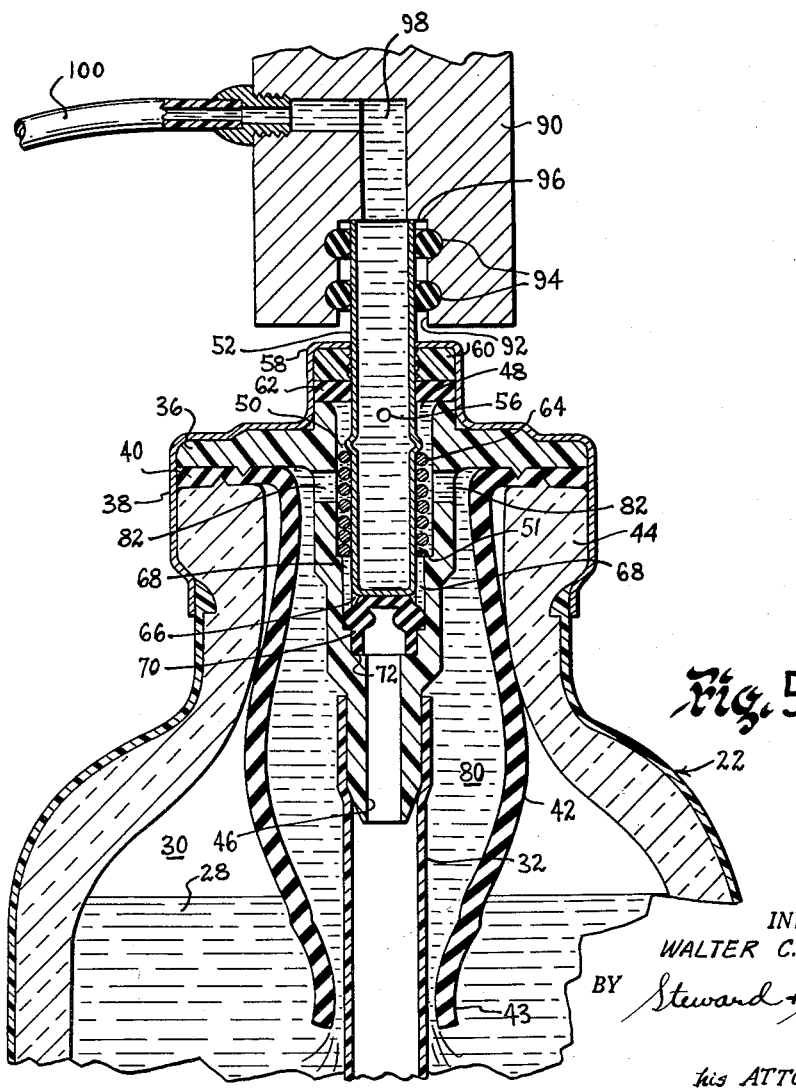
FIG. 5 is a sectional view in side elevation of a valve like that shown in FIGS. 1 and 2, wherein a separable actuator button or dispensing nozzle of the valve assembly has been removed and a filling head has been applied to the valve stem for pressure filling the container.

The metering valve construction just described provides a still further advantage in that it permits rapid pressure filling of the containers with propellant, or with both propellant and product material, after the valve assembly has been sealed in place on the container. This is illustrated in FIG. 5 wherein a container having a valve assembly of the type just described is shown. In the illustration, the actuator 26 has not been placed on the plunger in order that the pressure filling head 90 can be brought down into engagement with the plunger for filling operation. To this end, head 90 has a socket 92 adapted to receive the upper end of valve stem or plunger 52, and is provided with O-rings 94 to effect a pressure-tight seal with the periphery of the plunger. Socket 92 has a shoulder 96 at its bottom end which engages the rim of plunger 52 when the head is applied, and causes positive downward displacement of the plunger 52 as required during the filling operation. Socket 92 communicates by means of a duct 98 within the head with a flexible charging line 100 connected to the head for supplying the propellant thereto. Head 90 is mechanically reciprocated in a vertical direction by suitable mechanism, not shown, to cause the head to engage the valve stem of successive packages as they are advanced on a conveyor line in a filling plant, and while thus engaging the valve stem, to depress it so that restricted port 56 is moved below valve seat 62. While the valve stem is thus depressed, propellant, or propellant and product fluid, is or are introduced under pressure through flexible charging line 100. Fluid entering the head 90 under pressure is thus forced into the interior of plunger 52 and through restricted outlet 56 into chamber 50. From there it flows into chamber 66 where further passage out through the inlet port 46 of the valve body is prevented by plug 70 which is expanded under compression of the plunger 52. However, fluid introduced from the head may pass from chamber 50 through ports 82 into chamber 80 defined by sack 42. Moreover, under the pressure of the entering fluid, the lip 43 of sack 42, being resilient, is slightly distended by the pressure of the entering fluid, whereby the fluid may pass between the lip and the adjacent wall of dip tube 32 into the interior of container 22 to fill the latter, and/or charge it as the case may be. Lip 43 thus acts as a check valve. One of the important advantages of the arrangement just described is the fact that the passages afforded for the inflow of propellant or propellant and product are relatively large in this construction, whereby rapid pressure filling of the container is possible. The relatively small passages utilized and available for pressure filling purposes in prior metering valve constructions has often been a source of dissatisfaction with those earlier arrangements.

The action of lip 43 at the lower end of sack 42 in serving as a check valve may be effectively increased by causing the lip to extend axially along the dip tube 32 a short distance, whereby pressure in header space 30 of the container after the pressure head is removed, may act upon the lateral surface of the extended lips, causing them to hug the dip tube more closely.

Various materials may be used in forming the contractible sack 42. Normally, a rather flexible material of rubber or synthetic elastomeric composition, such as buna-N, is preferred, although the valve will function in its intended manner so long as the wall or walls defining chamber 80 are capable of serving as a flexible or contractible diaphragm or membrane and are capable of sufficient flexure to effect the discharge of a proper quantity of product fluid upon actuation of the metering valve. It will be obvious, too, from the foregoing that the nature of the material from which the sack 42 is formed will depend upon the type of propellant being used. Where the propellant is one which is not soluble or miscible either in the active ingredient or in a carrier in which the active ingredient is soluble or miscible, the fluid trapped in the metering chamber 80 will consist entirely of active ingredient. If it is desired to utilize the pressure of the gaseous propellant in header space 30 to expel the active ingredient from the chamber 80 a flexible walled sack must be used. Where the propellant is one which is soluble or miscible in the active ingredient or in a soluble or miscible carrier therefor, or where it is not desired to employ the pressure of the propellant in header space 30, the sack may, but need not, be flexible walled. The auxiliary metering chambers in these latter instances may have rigid walls. It will also be obvious from the foregoing that the physical size and arrangement of the auxiliary metering chamber will determine the dosage or amount of product metered upon each actuation of the metering valve. Thus the only part of the valve assembly that need be changed in order for the valve manufacturer to adapt it to meter different amounts is sack 42. It should be noted, however, that where the product dispensed is soluble in or miscible with the propellant so that some of the latter is trapped in the several chambers of the valve together with the product to be dispensed, then the volume of such product metered by the valve assembly will of course be determined by the combined volume of all of the chambers between the inlet and discharge ports in the valve assembly.

As shown in the illustrations in FIGS. 1, 2 and 5, sack 42 is extended into container 22 a substantial distance, and its lip 43 actually forms a seal with dip tube 32. Obviously, body 34 of the valve assembly could be extended and engagement of lip 43 made directly against such extended body.

Figure 6:
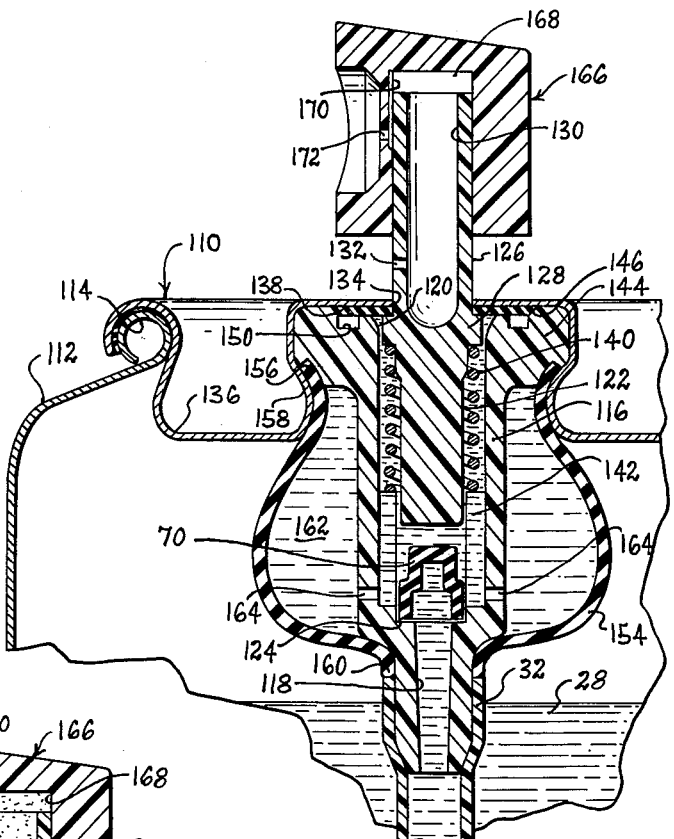
FIG. 6 is a fragmentary sectional view in side elevation of a modified form of metering valve embodying the invention, the assembly being shown in nondispensing condition.
Figure 7:
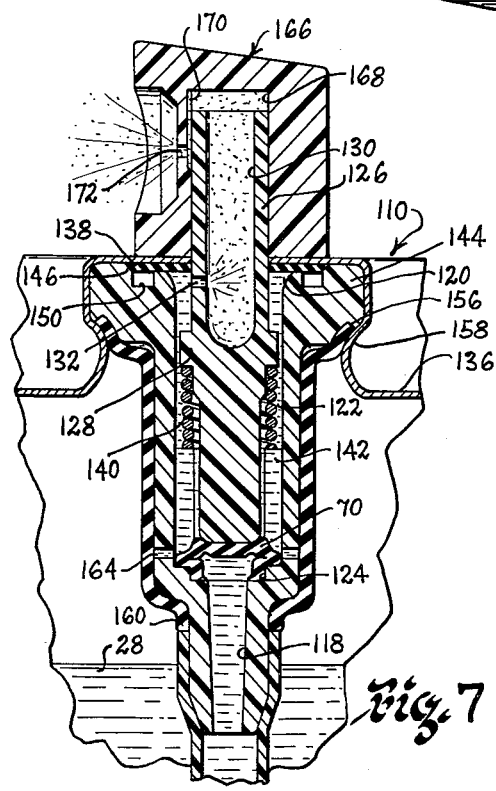
FIG. 7 is a view similar to that in FIG. 6, wherein the valve assembly is shown in dispensing condition.

Such a construction is shown in FIGS. 6 and 7. While the valve assembly 110 shown in these views differs in certain details from the construction shown and described hereinbefore, the principle of operation remains the same. The valve assembly shown in FIGS. 6 and 7 is adapted for use with a metal container 112 having a mouth formed at one end and encircled by a rolled rim 114. Again, valve assembly 110 comprises a substantially rigid tubular plastic valve body 116 having an inlet port 118 and an outlet port 120 at its opposite ends. Outer and inner chambers 122, 124, respectively, are interposed between the inlet and outlet ports of the valve body, chamber 122 being adjacent the discharge or outlet port and being concentric with but somewhat larger in diameter than chamber 124 adjacent the inlet port in the housing. A valve stem or plunger 126 is mounted for reciprocation within the aforesaid chambers as in the previous illustration. This plunger, however, is fabricated of a suitable molded plastic instead of metal. Intermediate its extent, the plunger is provided with a peripheral flange or shoulder 128 of slightly greater diameter than the body of the plunger itself. Below this flange the plunger is solid, while above it the plunger is hollowed out centrally to form a tubular passage 130. A restricted port 132 passes through the wall of the plunger into communication with this passage. This tubular stem portion passes upwardly through a closely fitting aperture 134 provided in the center of a closure cap 136. The valve assembly is supported in and secured to the container by means of this cap. Directly below the central portion of the closure cap and surrounding aperture 134, there is a sealing gasket 138 against which shoulders 128 abut upwardly in the normal, nonactuated position of the valve assembly. Plunger 126 is biased to this latter position by helical compression spring 140 which engages the under surface of shoulder 128 and rests at its lower end upon supporting ribs 142 formed in the lower part of chamber 122. These ribs project radially inward a short distance from the wall of chamber 122 and are spaced about its circumference not only to provide support for spring 140 but to serve also as guide rails for the lower end of plunger 126. The ribs serve also as alignment guides for an inlet port closing, as will presently be described. Ribs 142 thus act together with aperture 134 in closure cap 136 to prevent lateral or tilting movement of the valve stem in the assembly.

Valve body 116 is formed at its upper end with an enlarged head or annular collar 144. The upper surface of this collar has a circular depression 146 concentric with outlet 120, and the sealing gasket 138 is nested therein. Seal 138 is resilient and is formed with a central aperture in alignment with that closure cap 136, through which the valve stem also projects. Seal 138 thus makes a sliding, fluid-tight fit against the surface of the plunger 126 as the latter is reciprocated. The seal is held firmly in place in depression 146 by means of the closure cap 136 which overlies the upper surface of the valve body and is rolled or crimped about collar 144 thereof to maintain the seal in compression between the under surface of the closure cap and the bottom of depression 146 in valve body 116. A moat or annular groove 150 is recessed in the bottom of depression 146 in collar 144, concentric with but spaced from outlet 120 at the upper end of chamber 122. This moat helps to effect a better seal between gasket 138 and valve body 116, and it serves further to provide expansion space for the gasket to accommodate any swelling of that member which may take place as a result of contact with the product fluid. In this way binding forces are relieved which otherwise could cause the resilient gasket to grab plunger 126, resulting in improper sealing action of that member with the stem of the valve during reciprocation of the latter.

As in the previous example, this modified form of valve assembly 110 is provided with a resilient inlet port closing plug or member 70 which sits in the lower or inner chamber 124. The plug is slightly smaller in diameter than chamber 124 so that in the normal condition of the plug, fluid may pass upwardly through inlet 118 and around the plug into chambers 124, 122, respectively. Since the lower end of plunger 126 is normally spaced a short distance from the plug, such passage of fluid is facilitated by axially upward dispacement of the plug 70 which may take place under the influence of the incoming fluid. Again, however, tumbling or dislodgement of the plug is prevented, this time by means of the guides 142 mentioned hereinabove. The modified valve assembly 110 also includes a separable, resilient sack or casing 154 generally resembling sack 42 in FIGS. 1 and 2. In this instance, the upper margin 156 of the sack is gripped between collar 144 and the inwardly rolled or crimped portion 158 of closure cap 136 to form a seal thereat. Sack 154 is thus suspended from the head or collar 144 of valve body 116 and surrounds the lower portion thereof. The wall of the sack normally bellies outwardly, then turns inwardly toward a restricted opening at its underside defined by lip 160 which encircles the valve body 122 adjacent its inlet end. Lip 160 normally seals the lower end of sack 154 against the passage of fluid into or out of the sack at that point, and the sack thus forms an auxiliary metering chamber 162 surrounding the valve body. Chamber 162 communicates with chambers 122 and 124 within the valve body by means of bore holes 164 provided in the wall of valve body 116 adjacent the inlet port. Thus, in normal, nondispensing position of the valve assembly, product fluid 28 passes upwardly through dip tube 32, inlet 118 in valve body 116 to chambers 124, 122 of the valve body, and thence through bore holes 164 to chamber 162 until an equilibrium is reached between the pressure within the valve assembly and that existing in the upper portion of the container.

The modified valve structure 110 is operated by a molded plastic actuator 166 having an internal socket 168 within which the valve steam is received. Actuator 166 is formed with internal passages 170 leading from socket 168 to a discharge orifice 172 through which the product is dispensed.

The operation of this valve assembly is the same as described in connection with the arrangement shown in FIGS. 1 and 2. Depression of actuator 166 moves valve stem 126 downwardly until the lower end of the stem engages plug 70 and compresses it into sealing engagement with the adjacent end and side walls of chambers 124, 122 of the valve body. At this point, the restricted outlet 132 in the valve stem is brought below seal 138, as seen in FIG. 7, and fluid contained in chambers 122, 124 and 162 is thus enabled to escape through outlet 132 and from there to the discharge orifice 172 in actuator 166. The discharge of such fluid is assisted, or accomplished entirely as the case may be, by pressure of the propellant within container 112 acting against the walls of sack 154 to collapse the latter against valve body 116. When this has fully occurred, no further material can be dispensed so long as the valve is held in the depressed or dispensing position. Release of the actuator 166 and return of the valve plunger 126 to its upper position under the influence of spring 140 first moves restricted outlets 132 of the plunger above seal 138 and therefore out of communication with chamber 122. Further upward movement of the plunger then opens the inlet port by releasing plug 70 to allow it to return to its normal, non-expanded condition. This allows fluid to flow into chambers 124, 122 and 162, respectively, until pressure equilibrium is again reached, and the valve mechanism is then ready for a further dispensing cycle of operation.

Pressure filling of container 112 may be accomplished after the installation of the valve assembly as described hereinbefore. That is, a pressure filling head can be applied to the upper end of plunger 126 in place of the actuator 166, and the plunger depressed so as to bring restricted outlet 132 below valve seat 138. Fluid may then be introduced from the pressure filling head through tubular bore 130 and outlet 132 and into chambers 122, 124 and 162. Again, lip 160 at the lower end of sack 154 will be distended by the filling pressure to allow fluid in chamber 162 to pass between lip 160 and the outer surface of the valve body 122. In the specific example illustrated in FIGS. 6 and 7, lip 160 is shown in abutment with the upper end of dip tube 32 at the lower end of valve body 116. This arrangement is satisfactory for most purposes although it may be preferable to space the upper end of the dip tube 32 slightly from lip 160 to prevent interference therewith and to facilitate the outward flow of fluid at that point during pressure filling operations.

The foregoing descriptions of two particular metering valves have both then characterized for purposes of illustration by certain details of construction in the inlet and discharge porting arrangements with which the expansible-collapsible sack member 42 or 154 constituting the auxiliary or metering chamber cooperates to dispense a measured amount of product on each actuation of the valve. However, it is apparent that the operation of the sack member is not dependent upon the specific type of inlet and discharge porting means just described, but will operate quite as well with specifically different forms of porting means, and the claims which follow are intended to cover such constructions.

Metering valves of the type herein disclosed are especially suited for use with such propellant as nitrogen gas which, because of its almost complete inertness to most materials, is ideally suited from that standpoint for pressurizing packages of a wide variety of products. But because nitrogen does not condense at any pressure or temperature which is practical to attain or maintain in the type of packaging herein dealt with, metered dispensing from packages using nitrogen as the propellant has heretofore presented considerable difficulty. Such difficulty is completely overcome by the novel metering valve construction disclosed herein, and the arrangement is, at the same time, one which lends itself to mass manufacture at extremely low cost, and one which can be modified easily with a minimum of change in component parts to meter any desired amount of product on each actuation of the valve assembly. The novel valve construction is equally useful, moreover, with non-homogeneous or 3-phase formulations, or even with homogeneous formulations, as described above, thus giving the valve manufacturer a standard valve structure which can serve to give any desired metering capacity with every type of product-propellant combination or formulation used today.

As was stated above, the nature of the material from which the sack 42 is formed depends upon the type of propellant used in the header space of the pressurized package. In those products employing a propellant which is not soluble or miscible in either the active ingredient or in a carrier liquid, a flexible walled sack is necessary if the pressure in the header space is to be used to expel the active ingredient in the sack. Where, however, the propellant is one which is soluble or miscible in the active ingredient, or in a carrier in which the active ingredient is soluble or miscible so that it is not necessary to employ the pressure of the propellant in the header space, the sack need not be flexible. In such cases a rigid walled casing may be used since the fluid product trapped in the metering chamber will include, in addition to the active ingredient, a portion of propellant in liquid phase. Upon actuation of the valve operating member and the venting of the metering chamber to atmosphere, the liquid propellant therein flashes into a vapor due to the fact that the vapor pressure of the propellant is higher than atmospheric pressure. The rapid expansion of the propellant as it vaporizes, thus, forces the active ingredient out of the metering chamber. Because of this vaporization of the propellant in the metering chamber it is not necessary to utilize the pressure in header space 30 to expel the fluid product in the metering chambers.

Such a construction is shown in FIGS. 8, 9 and 10. The valve assembly shown there is adapted for use with a glass container 222 having the usual mouth and lip 244 formed at one end. As before, the basic metering valve construction substantially accords with the teachings of my prior Patent 2,932,432 and comprises a substantially rigid, tubular, metal valve body 234 with suitable inlet and outlet ports 246, 248, respectively, at its opposite ends. Outer and inner chambers 250 and 266, respectively, are interposed between the inlet and outlet ports of the valve body, one chamber 250, that adjacent the discharge or outlet port 248, being concentric with but somewhat larger in diameter than the other chamber 266 adjacent the inlet port 246. A valve stem or plunger 252 is mounted for reciprocation within the aforesaid chambers as in the previous illustrations. This plunger, however, is provided with a somewhat different sealing arrangement. The generally tubular-shaped valve body is provided with the customary rigid flange 236 and below this flange there is interposed a resilient, annular gasket member 240 that serves as a seal between the flange 236 of the valve body and the upper lip 244 of the glass container. A rolled rim 238 encircles the flange 236 and gasket 240 and retains the valve assembly on the container.

At its central portion, the valve body 234 is provided with a generally circular recess 259 that extends downwardly of the rigid flange and forms a well through which the valve stem 252 protrudes. Seated within the bottom portion of this recess is another resilient gasket member 260. The gasket member 260 forms a sliding but fluid-tight seal with the periphery of the plunger 252, permitting reciprocation of the latter without loss of propellant pressure around the plunger body during movement thereof. A correspondingly formed depression 258 in the central portion of the closure cap 238 serves as a retainer for the gasket member 260 and retains the gasket within the recess.

As in the case of the previous examples, this form of valve assembly is provided with a resilient inlet port closing plug or member 270 which sits in the lower or inner chamber 266. The plug is slightly smaller in diameter than the chamber 266 so that fluid may pass upwardly and around the plug into the chambers 266 and 250. The valve assembly also includes a coil spring 264 which extends between the bottom 251 of the metering chamber 250 and the enlargement 254 formed adjacent the middle portion of the valve plunger 252.

As before a separable, outer casing 242 is provided, but unlike the previously described casings which have comprised flexible sacks the casing 242 is a generally tubular, rigid walled open-ended casing. The casing 242 is mounted on the outer surface of the valve body 234 and the engagement of the casing 242 with the valve body 234 is such that sufficient friction is provided to firmly retain the upper and lower ends of the casing in fluid-tight engagement with the valve body. In preferred form the casing 242 is formed from a plastic material so as to be slightly deformable when inserted over the valve body. However, the casing may be made from metal or any other suitable material as desired.

Due to the reductions in diameter of the valve body 234 and the constant diameter of the casing 242 there is defined between these two members an auxiliary metering chamber 280. The auxiliary metering chamber 280 is communicated with the chambers 266 and 250 by means of the bore holes 282 so as to add its metering capacity to that of the chambers 266 and 250. While the casing is shown as having a constant diameter and as terminating adjacent the lower end of the valve body 234 it will be readily understood that the casing 242 could be of any proper configuration required to give the desired metering capacity and could terminate at any desired point, either on the valve body or farther below on the dip tube.

The operation of the metering valve assembly is similar to that described in connection with the valve assemblies shown in FIGS. 1–7. Depression of the actuator 226 moves the valve plunger 252 downwardly until the lower end engages the sealing plug 270 and compresses it into sealing engagement with the chamber 266. When the restricted outlet 256 passes below the seal 260, the chambers 250, 266 and 280 are communicated to the atmosphere through the outlet 256 and the passages 225 and 227 in the valve operating member 226. This communication reduces the pressure in the chambers to atmospheric pressure and the liquid propellant in the chambers immediately vaporizes. The expansion of the propellant as it vaporizes forces the active ingredient in these chambers out through the passages in the actuating member and thus effects a metered dispensing of the fluid product.

Release of the actuator 226 and return of the plunger 252 to its upper position under the influence of the spring 264 first moves the outlet 256 above the seal 260 and therefore out of communication with the metering chambers. Further upward movement of the plunger then opens the inlet port by releasing the sealing plug 70 and allowing it to return to its normal nonexpanding condition. Additional fluid product is then free to flow into the metering chambers 250, 266 and 280 until they are completely filled with fluid product. The valve mechanism is then prepared for another operating cycle.

The foregoing descriptions of various metering valves have been given for purposes of illustrating the invention and for instructing the art how the present invention may be practiced. It will be readily understood that the invention may be applied to other metering valves than those shown and described herein. The specific embodiments shown and described herein are not, therefore, restrictive of the invention and do not serve to define the scope of the invention, the claims appended hereto being relied upon for that purpose.

What is claimed is:

1. A metering dispenser for pressurized packages of fluid materials, which comprises a substantially rigid tubular valve body having axially spaced inlet and outlet ports and a fluid chamber intermediate said ports, an extension on said body at its inlet end forming a duct for delivery of fluid to said inlet port, a plunger mounted for reciprocation in said fluid chamber and extending axially outwardly therefrom at said outlet port end, port closing means positioned at each of said ports, the port closing means at said outlet port being normally closed and the port closing means at said inlet port being normally open, said port closing means operating sequentially upon inward movement of said plunger first to close said inlet port and then open said outlet port, conduit means communicating with the interior of the package and the inlet port for the valve body, a flexible-walled sack extending along and enclosing a portion of said valve body and extension and having openings at its opposite ends, the margin of one of said openings being adapted for permanent securement in fluid-tight relation to said valve body adjacent said outlet port, the other of said openings resiliently gripping said conduit means in fluid-tight relation, said sack thus defining an auxiliary fluid chamber intermediate said openings, and a passageway formed through the wall of said tubular body member to provide continuously open communication between said valve body chamber and said auxiliary chamber.

2. A metering dispenser as defined in claim 1, wherein said conduit means includes a dip tube for extending into contact with a fluid in a container, and said other opening of said sack is stretched about said tube to form a normally fluid-tight seal on its circumference intermediate its extent.

3. A metering dispenser as defined in claim 1, wherein said sack is provided with an integral sleeve portion at said other opening which extends axially along said conduit means in normally fluid-tight but resilient engagement therewith.

4. A metering dispenser for pressurized packages which comprises a valve body having a hollow interior defining an internal chamber forming a first metering chamber and spaced intake and discharge ports for said chamber for respectively connecting the interior of said chamber with the interior of the pressurized package and with the atmosphere, valve means associated with each such port, the valve means of the discharge port being normally closed and that at the intake port being normally open, means for actuating said valve means sequentially to close the inlet port and open said outlet port, and a separable auxiliary rigid-walled outer casing forming a second metering chamber mounted exteriorly of said valve body and so formed as to define therewith an auxiliary metering chamber, said chamber being continuously communicated with the internal chamber therein intermediate said spaced intake and discharge ports.

5. A metering dispenser as set forth in claim 4, wherein said outer casing has an open end and said open end is adapted to engage the valve body in fluid-tight relationship.

6. A metering dispenser as set forth in claim 5, wherein said outer casing frictionally engages the outer surface of said valve body.

7. A metering dispenser for pressurized packages which comprises a hollow valve body forming a first fluid chamber for entrapping a predetermined amount of fluid and having spaced inlet and outlet ports for connecting the fluid chamber of said body with the interior of the pressurized package and with the atmosphere, respectively, sealing means associated with each such port, the sealing means at said outlet port being normally closed by said sealing means and the sealing means at said inlet port being normally open, other means acting sequentially to close said inlet port and open said outlet port, conduit means communicating the interior of the package with the inlet port for the valve body, and a casing having an internal chamber mounted exteriorly of said valve body so as to enclose a portion thereof to form a second fluid chamber for entrapping a predetermined amount of fluid and said casing being in sealing engagement with said conduit means, said internal chamber being in continuously open communication with the first fluid chamber of the valve body intermediate said spaced inlet and outlet ports.

8. A metering dispenser for pressurized packages which comprises a hollow valve body forming a first fluid chamber for entrapping a predetermined amount of fluid and having spaced inlet and outlet ports connecting the fluid chamber of said body with the interior of the pressurized package and with the atmosphere, respectively, port closing means located at each of such ports, the port closing means at said outlet port being normally closed and the port closing means at said inlet port being normally open, other means cooperating with said port closing means sequentially to close the inlet port and open the outlet port, conduit means communicating the interior of the package with the inlet port for the valve body, and a casing having an internal chamber surrounding a part of said valve body and engaging the valve body and conduit means normally in fluid-tight relation at spaced points to form a second fluid chamber for entrapping a predetermined amount of fluid, said valve body having a lateral passage through its wall intermediate said ports and opening into said internal chamber intermediate said spaced points to provide open communication between the first fluid chamber of said valve body and said internal chamber.

9. A metering dispenser for pressurized packages of fluid materials which comprises a tubular valve body having an inlet port adjacent its inner end and an outlet port adjacent its outer end, port closing means positioned at each such port, the port closing means at said outlet port being normally closed and the port closing means at said inlet port being normally open, other means cooperating with said port closing means sequentially first to close the inlet port and then open the outlet port, conduit means communicating the interior of the package with the inlet port of the valve body, and a flexible-walled casing having an internal chamber surrounding said valve body and in fluid-tight engagement with the valve body and said conduit means to provide a closed auxiliary chamber defined by the interior of said flexible-walled casing and the exterior of said valve body, the internal chamber of said flexible-walled casing being in communication with the interior of the package when the inlet port of the valve body is open and with the atmosphere when the outlet port of the valve body is open.

10. In a pressurized package construction for a fluid product to be dispensed in measured amounts therefrom, the combination which comprises a container having an open mouth, and a lip thereat, a tubular valve body, closure means mounting and securing said valve body and said container mouth in fluid-tight relation with the lip thereof, said valve body having spaced inlet and outlet ports defining between them a fluid chamber, port closing means carried by said tubular body and positioned in said inlet and outlet ports, respectively, said ports connecting said chamber with the interior of the pressurized package and with the atmosphere, respectively, the port closing means at said outlet port being normally closed and the port closing means at said inlet port being normally open, other means cooperating with said port closing means sequentially first to close the inlet port and then open the outlet port, conduit means communicating the interior of the package with the inlet port and valve body, a flexible-walled casing having an internal chamber surrounding a portion of said valve body, said casing being in sealing engagement with the exterior of said valve body and conduit means at axially spaced points to define with said body an auxiliary fluid metering chamber, and a passageway formed through a wall of said body intermediate said port closing means and communicating with the interior of said auxiliary metering chamber.

11. The combination defined in claim 10, wherein said flexible casing has one end which resiliently grips said valve body normally in fluid sealing engagement but is distensible in response to pressure within said internal chamber.

12. The combination as defined in claim 11, wherein said flexible casing has another end that is secured to said valve body by clamping engagement between said body and said container lip.

13. A metering dispenser for pressurized packages wherein a fluid product is confined within a container under the superatmospheric pressure of a gaseous propellant, said metering dispenser comprising a hollow valve body defining an internal chamber which forms a first fluid chamber for entrapping a predetermined amount of fluid and having spaced inlet and outlet ports for communicating the internal chamber with the interior of the pressurized package and with the atmosphere, respectively, sealing means associated with each of said ports, the sealing means at said outlet port being normally closed by said sealing means and the sealing means at said inlet port being normally open so that the pressure in the package may fill the internal chamber in the valve body with fluid product without the fluid product discharging from the package, valve means acting sequentially to close said inlet port and to open said outlet port to discharge the fluid product into the atmosphere, conduit means communicating the interior of the package with the inlet port for the valve body, and a casing defining an internal chamber mounted exteriorly of said valve body so as to enclose a portion thereof and to form therewith a second fluid chamber for entrapping a predetermined amount of the fluid product, said second fluid chamber being in continuously open communication with the internal chamber of the valve body at a point intermediate said spaced inlet and outlet ports whereby said second fluid chamber may be alternately communicated with the interior of the package and with the atmosphere at the same time that the internal chamber in the valve body is so communciated.

14. A metering dispenser for pressurized packages of fluid materials which comprises a valve body having an outlet port communicating with the atmosphere, port closing means for the outlet port, said outlet port closing means being normally closed, a contractable hollow casing defining an enclosed fluid chamber, said chamber being normally communicated with the interior of the package, and means for sequentially closing off said fluid chamber from communication with the interior of the package and for opening the outlet port closing means and communicating the fluid chamber with the atmosphere through said open outlet port whereby the pressure within the package will cause said chamber to contract and to expel the fluid material therewithin.

15. A metering dispenser for pressurized packages of fluid materials which comprises a valve body having an outlet port communicating with the atmosphere and an inlet port communicating with the interior of the pressurized package, port closing means for each port, the port closing means for said outlet port being normally closed and the port closing means for said inlet port being normally open, a contractable hollow casing defining an enclosed fluid chamber, said chamber being normally communicated with the interior of the pressurized package through said normally open inlet port, and means for sequentially closing off said fluid chamber from communication with the interior of the package and for opening the outlet port closing means and communicating the fluid chamber with the atmosphere through said open outlet port whereby the pressure within the package will cause said chamber to contract and to expel the fluid material therewithin.

References Cited in the file of this patent

UNITED STATES PATENTS

| | | |
|---|---|---|
| 2,746,796 | St. Germain | May 22, 1956 |
| 2,823,953 | McGeorge | Feb. 18, 1958 |
| 2,856,105 | Ward | Oct. 14, 1958 |
| 2,858,053 | Waldherr | Oct. 28, 1958 |
| 2,932,432 | Beard | Apr. 12, 1960 |

FOREIGN PATENTS

| | | |
|---|---|---|
| 740,635 | Great Britain | Nov. 16, 1955 |